Patented Oct. 31, 1939

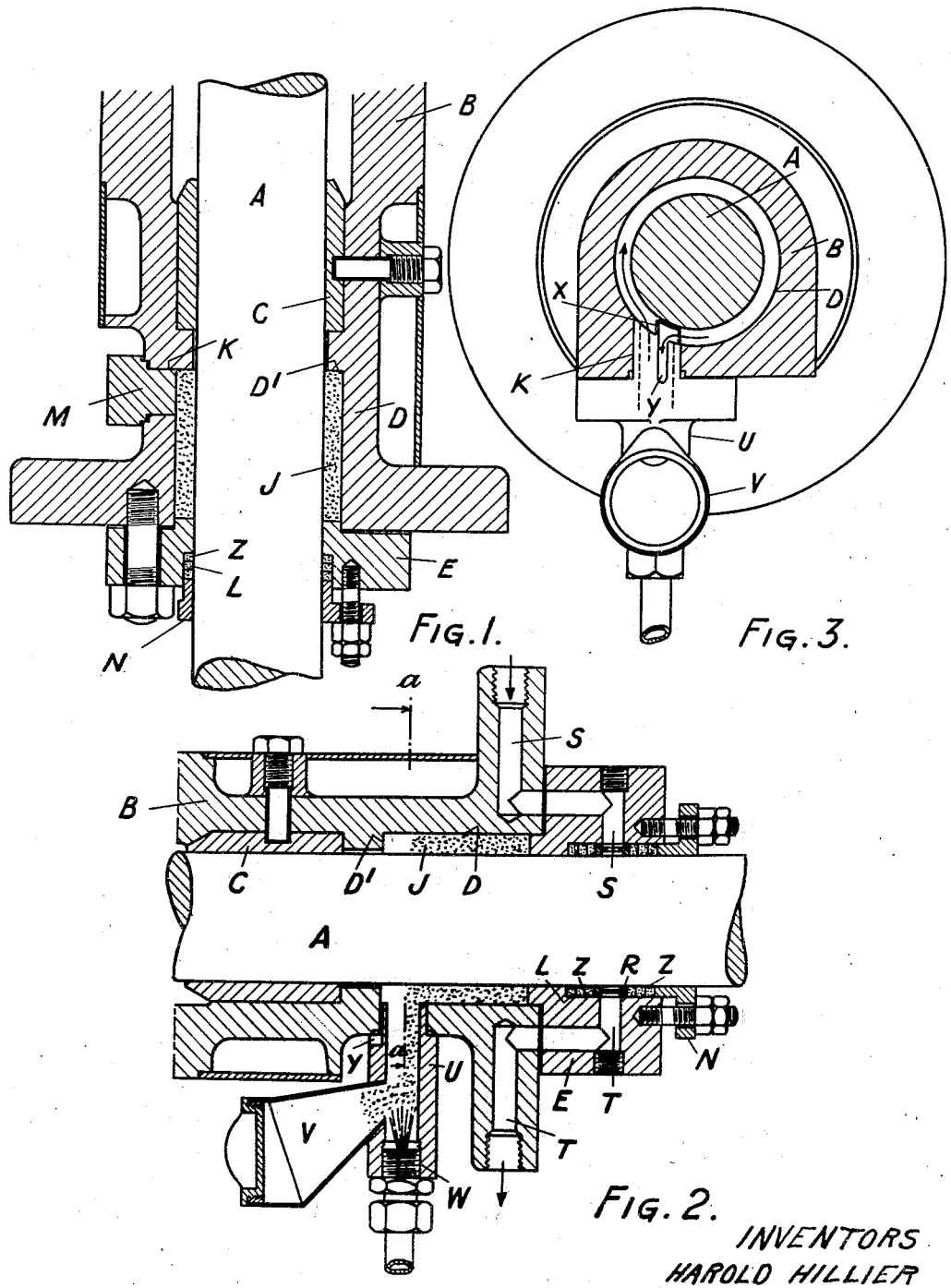

2,178,075

UNITED STATES PATENT OFFICE 2,178,075

STUFFING BOX FOR FLUID PRESSURE ENGINES

Harold Hillier and James Sim, Cathcart, Glasgow, Scotland, assignors to G. & J. Weir, Limited, Cathcart, Glasgow, Scotland, a corporation of the United Kingdom of Great Britain and Northern Ireland Application September 7, 1938, Serial No. 228,790
In Great Britain October 22, 1937

1 Claim. (Cl. 286—38)

This invention relates to stuffing boxes for fluid pressure engines such as, for example, pumps for pumping liquids or gases, and consists of an improved construction of stuffing box provided, at or near the inner end of the packing space, with a normally closed opening through which packing such as, for example, plastic or granular packing, may be introduced in order to pack the stuffing box.

According to the present invention a stuffing box is provided at or near the inner end of the main packing space with a normally closed opening through which packing can be introduced into the packing space of the stuffing box.

The main gland itself is provided with a small subsidiary or wiper gland with or without a lantern ring to permit a leak off and/or a supply of cold water to quench the leak off where the leak off is undesirably hot.

To facilitate introduction of the packing into the packing space we may provide in the stuffing box an opening adapted for reception of a nipple incorporating a hopper into which the packing is inserted and is thereafter subjected to a blast of water or air which carries the packing through the nipple into the packing space, the nipple being provided with a packing-diverting rib and a vent for egress of water or air after the packing has been distributed into the stuffing box.

Several practical constructions according to the invention will now be described in detail with reference to the accompanying drawing in which Fig. 1 is an axial section of a stuffing box, and Fig. 2 an axial section and Fig. 3 a part elevation part transverse section on the line a—a of Fig. 2, of a modification.

Referring to Fig. 1, the engine spindle A may have either a reciprocating or a rotary motion, depending upon the duty for which the engine is designed.

The engine body B is bored out to accommodate a neck ring C which guides the spindle A. The outer end of the body B is bored out to form the packing space D of the stuffing box, the inner end of said space D being closed by an annular shoulder $D^1$, and the outer end being closed by a main gland E. The space D is filled with packing J which is inserted into the space D through an opening K provided at the inner end of the space D. This opening K is normally closed by a closure member or plug M when the engine is in operation. A subsidiary stuffing box is provided in the main gland E, the packing Z of the subsidiary packing space L being held in position by a subsidiary adjustable gland N.

The main gland E is bolted against the engine body B so as to prevent any leakage from the stuffing box other than the leakage which may occur along the spindle A. The provision of subsidiary stuffing box with a packing space L, adjustable gland N and packing Z minimises wastage of main packing J which might occur between the spindle A and the bore of the main gland E.

According to the modification shown in Figs. 2 and 3, in which the packing space D is filled with packing J which is introduced into the space D through an opening K located at the inner end of the space D and disposed substantially tangentially of the stuffing box, wastage of packing J from the stuffing box is prevented on the exterior diameter by a main gland E which forms a joint against the engine body B and is non-adjustable. The main gland E is provided with a subsidiary stuffing box L, Z, N in the packing space L of which is arranged a lantern ring R communicating with inlet passages S for the admission of cooling water to the lantern ring, and outlet passages T for the leak-off of cooling water and any leakage of liquid passing the main stuffing box. At each end of the lantern ring R the packing Z is used to prevent leakage past the subsidiary stuffing box. In this construction the opening K through which the packing J is introduced into the space D is fitted with a tubular nipple U provided with a lateral hopper V from which the packing is fed into the bore of the nipple U. In the outer end of the nipple U there is fitted a nozzle W through which water or air may be injected under pressure so as to entrain or carry the packing and cause it to flow into the space D. The water or air, together with the entrained packing, is forced to take a rotary direction by a diverting rib X, the water or air used as the vehicle being allowed to escape to atmosphere through a passage Y formed in the nipple. When the space D is filled with packing, the packing admission nipple U is replaced by a closure member and the engine is ready for operation.

It will be understood that the invention is not limited to the specific constructions described, and that these may be varied without departure from the scope of the invention.

We claim:

In combination with a shaft, a pressure fluid stuffing box for said shaft having a packing inlet substantially at the inner end of said space, and a packing injector device communicating with said packing inlet comprising a fluid injection nozzle, and a packing delivery conduit terminating in the path of fluid ejected from said nozzle so that the energizing fluid ejected from said nozzle will cause packing to be withdrawn from said packing delivery conduit and carried into said packing space, said injector device also having a return passage for the escape of the energizing fluid.

HAROLD HILLIER.
JAMES SIM.